United States Patent
Chiang et al.

(10) Patent No.: US 10,694,103 B2
(45) Date of Patent: Jun. 23, 2020

(54) BUILDING SYSTEM AND BUILDING METHOD FOR PANORAMA POINT CLOUD

(71) Applicant: INDUSTRIAL TECHNOLOGY RESEARCH INSTITUTE, Hsinchu (TW)

(72) Inventors: Chih-Tsung Chiang, Tainan (TW); Yi-Cheng Chen, New Taipei (TW); Shih-Ching Huang, Kaohsiung (TW); Yi-Tong Liu, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 165 days.

(21) Appl. No.: 15/960,947

(22) Filed: Apr. 24, 2018

(65) Prior Publication Data

US 2019/0327412 A1    Oct. 24, 2019

(51) Int. Cl.
*H04N 5/232* (2006.01)
*H04N 13/00* (2018.01)
(Continued)

(52) U.S. Cl.
CPC ........... *H04N 5/23238* (2013.01); *G06T 7/11* (2017.01); *G06T 7/187* (2017.01); *H04N 13/239* (2018.05); *G06T 2207/10028* (2013.01)

(58) Field of Classification Search
CPC .. H04N 5/23238; H04N 13/239; G06T 7/187; G06T 7/11; G06T 2207/10028; G06T 3/4038; G06T 7/194
(Continued)

(56) References Cited

U.S. PATENT DOCUMENTS 7,126,630 B1    10/2006 Lee et al.
7,499,586 B2    3/2009 Agarwala et al.
(Continued)

FOREIGN PATENT DOCUMENTS

CN    101442618 A    5/2009
CN    103150715 A    6/2013
(Continued)

OTHER PUBLICATIONS

Häne et al., "Obstacle Detection for Self-Driving Cars Using Only Monocular Cameras and Wheel Odometry," IEEE/RSJ International Conference on Intelligent Robots and Systems (ROS), Sep. 28-Oct. 2, 2015, pp. 5101-5108.
(Continued)

*Primary Examiner* — Susan E. Hodges
(74) *Attorney, Agent, or Firm* — Birch, Stewart, Kolasch & Birch, LLP

(57) ABSTRACT

A building method and a building system for panorama point cloud data are provided. The building method for panorama point cloud data includes the following steps. At least one reference geometric object located at an overlap region of two adjacent three-dimensional capturing devices is captured by the two adjacent three-dimensional capturing devices to obtain two reference point cloud sets. A reference feature plane is obtained from each of the reference point cloud sets. A coordinate transformation matrix is obtained according to the reference feature planes. A plurality of real-time point cloud sets are obtained by the three-dimensional capturing devices. The coordinate transformation of the real-time point cloud sets are performed according to the coordinate transformation matrix, and the real-time point cloud sets are combined to obtain the panorama point cloud data.

19 Claims, 5 Drawing Sheets

(51) Int. Cl.
*G06T 7/00* (2017.01)
*H04N 13/239* (2018.01)
*G06T 7/187* (2017.01)
*G06T 7/11* (2017.01)

(58) Field of Classification Search
USPC .......................................................... 348/38
See application file for complete search history.

(56) References Cited

U.S. PATENT DOCUMENTS

| | | | |
|---|---|---|---|
| 7,640,108 B2 | 12/2009 | Shimizu et al. | |
| 8,502,860 B2 | 8/2013 | Demirdjian | |
| 9,269,155 B2* | 2/2016 | Zhang | G06T 7/194 |
| 9,369,689 B1* | 6/2016 | Tran | G06T 7/593 |
| 10,102,827 B2* | 10/2018 | Putraya | G06T 3/4038 |
| 2008/0253685 A1 | 10/2008 | Kuranov et al. | |
| 2011/0316963 A1* | 12/2011 | Li | H04N 7/15 |
| | | | 348/14.1 |
| 2012/0105574 A1 | 5/2012 | Baker et al. | |
| 2012/0300020 A1 | 11/2012 | Arth et al. | |
| 2014/0043436 A1* | 2/2014 | Bell | G06T 19/20 |
| | | | 348/46 |
| 2015/0341552 A1 | 11/2015 | Chen et al. | |
| 2016/0110913 A1 | 4/2016 | Kosoy et al. | |
| 2017/0109940 A1 | 4/2017 | Guo et al. | |
| 2017/0195560 A1* | 7/2017 | Veldandi | G06T 7/55 |

FOREIGN PATENT DOCUMENTS

| | | |
|---|---|---|
| CN | 104966062 A | 10/2015 |
| CN | 106878687 A | 6/2017 |
| JP | 2004-242048 A | 8/2004 |
| TW | I571099 B | 2/2017 |
| TW | 201739647 A | 11/2017 |
| TW | I613106 B | 2/2018 |
| TW | I615808 B | 2/2018 |
| TW | 201812531 A | 4/2018 |

OTHER PUBLICATIONS

Jiang et al., "A Sensor Guided Autonomous Parking System for Nonholonomic Mobile Robots," Proceedings of the 1999 IEEE International Conference on Robotics & Automation, May 1999, pp. 311-316.
Lai et al., "Depth Rendering for Vehicle Collision Avoidance Applications," ICCE—Taiwan, 2014, pp. 73-74.
Mičušík et al., "Piecewise Planar City 3D Modeling from Street View Panoramic Sequences," IEEE Conference on Computer Vision and Pattern Recognition, Jun. 20-25, 2009, 7 pages.
Reichardt et al., "CarTALK 2000 Safe and Comfortable Driving Based Upon Inter-Vehicle-Communication," IEEE Intelligent Vehicle Symposium, Jun. 17-21, 2002, pp. 545-550.
Taiwanese Office Action and Search Report for Taiwanese Application No. 107113877, dated Dec. 12, 2018.

* cited by examiner

2

BUILDING SYSTEM AND BUILDING METHOD FOR PANORAMA POINT CLOUD

BACKGROUND

Technical Field

The technical field relates in general to a building method and a building system for panorama point cloud data.

Description of the Related Art

In recent years, more and more attentions are given to vehicle safety. In the regulations of the government, it has been required that new vehicles must be equipped with an advanced driver assistance systems (ADAS) to assure transport safety. Additionally, along with the rapid advance in artificial intelligence, the applications of automated mobile carriers and robots have become more and more popular. The applications of mobile carriers or robots also require a mobile assistance system to facilitate the movement.

Most of the current driver/mobile assistance systems adopt an ultra-sound radar and use two-dimensional images to assist the judgment of obstacles. However, the ultra-sound radar has a small working range, and requires the use of multiple sensors to eliminate the blind spots of detection in the surrounding of the vehicle. Alternatively, some driver/mobile assistance systems adopt infrared radar sensors, which have a lower detection angle and may easily misjudge obstacles in the rain or the fog. Some other driver/mobile assistance systems adopt two-dimensional image sensors. A two-dimensional image sensor alone cannot detect its distances to an object, and may easily misjudge obstacles at night, in the rain or the fog, and may not function well. Moreover, the above driver/mobile assistance systems cannot obtain a precise three-dimensional measurement within a near distance of 0.5~5 meters, and therefore cannot provide satisfactory safety assurance.

SUMMARY

The invention is related to a building method and a building system for panorama point cloud data. Point cloud registration is performed through a point cloud alignment procedure, and a point cloud real-time capturing procedure is performed to obtain a panorama point cloud data. The panorama point cloud data has high precision and is capable of obtaining the near distance status within 0.5~5 meters, and is particularly applicable to the driver/mobile assistance system.

According to one embodiment of the present invention, a building method for panorama point cloud data is provided. The building method for panorama point cloud data includes the following steps. At least one reference geometric object located at an overlap region of two adjacent three-dimensional capturing devices is captured by the two adjacent three-dimensional capturing devices to obtain two reference point cloud sets. A reference feature plane is obtained from each of the reference point cloud sets. A coordinate transformation matrix is obtained according to the reference feature planes. A plurality of real-time point cloud sets are obtained by the three-dimensional capturing devices. The coordinate transformation of the real-time point cloud sets are performed according to the coordinate transformation matrix, and the real-time point cloud sets are combined to obtain a panorama point cloud data.

According to another embodiment of the present invention, a building system for panorama point cloud data is provided. The building system for panorama point cloud data includes two three-dimensional capturing devices, a feature processing unit and a coordinate processing unit. The three-dimensional capturing devices are disposed adjacent to each other and configured to capture at least one reference geometric object located at an overlap region of the three-dimensional capturing devices to obtain two reference point cloud sets, respectively. The feature processing unit is configured to obtain a reference feature plane from each of the reference point cloud sets. The coordinate processing unit is configured to obtain a coordinate transformation matrix according to the reference feature planes. The three-dimensional capturing devices further perform capturing to obtain a plurality of real-time point cloud sets. The coordinate processing unit performs coordinate transformation of the real-time point cloud sets according to the coordinate transformation matrix, and combines the real-time point cloud sets to obtain the panorama point cloud data.

The above and other aspects of the invention will become better understood with regard to the following detailed description of the preferred but non-limiting embodiment (s). The following description is made with reference to the accompanying drawings.

DETAILED DESCRIPTION OF DISCLOSED EMBODIMENTS

Figure 1:
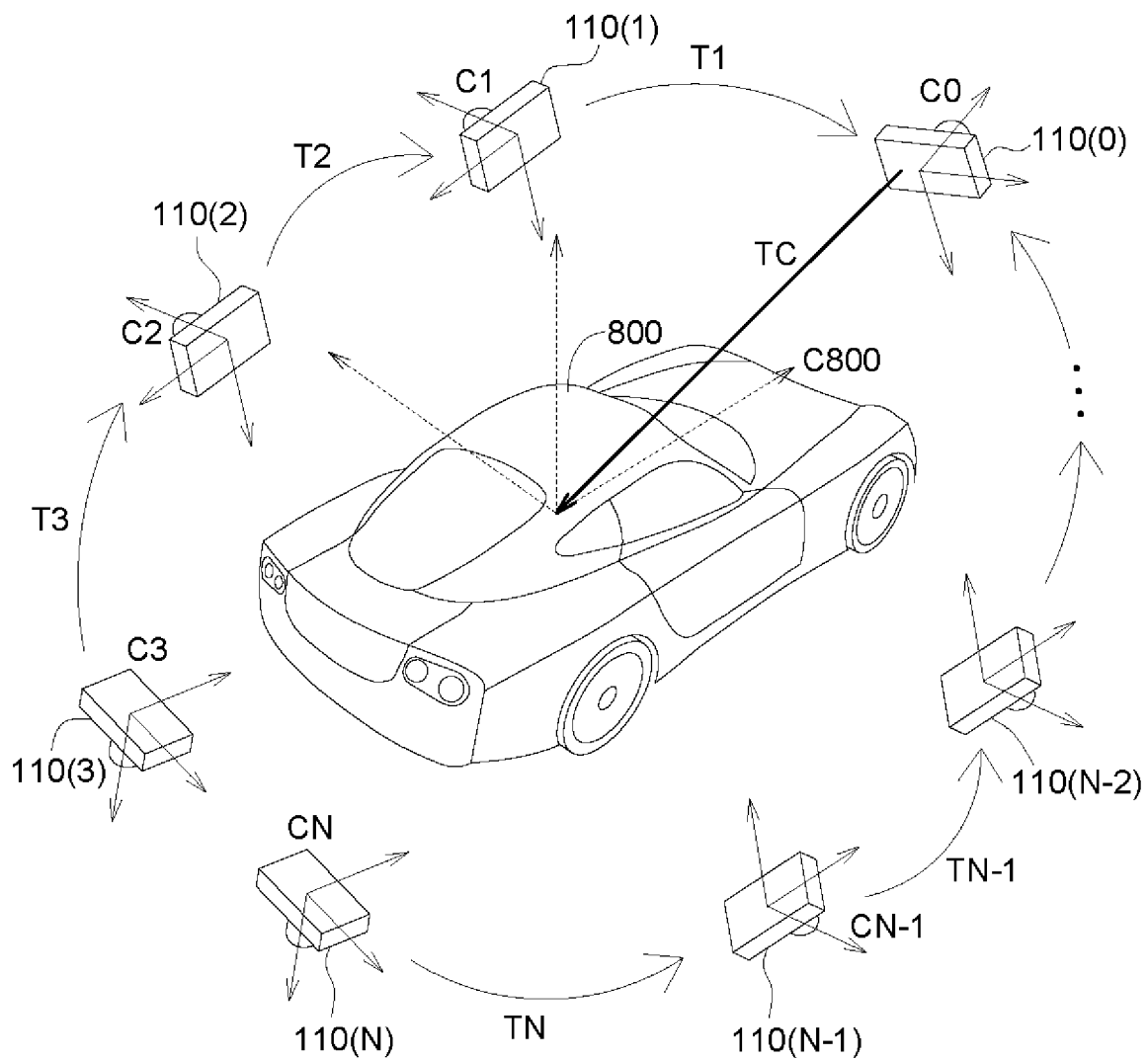
FIG. 1 is a schematic diagram of a mobile carrier and a number of three-dimensional capturing devices.
Figure 2:
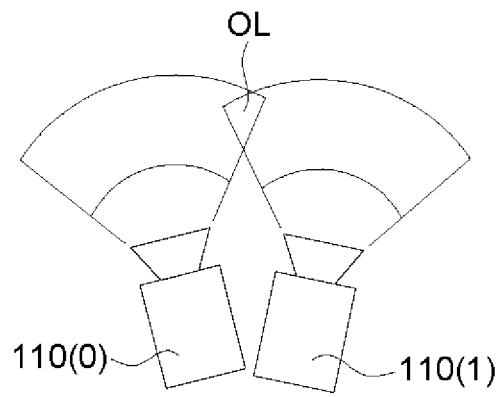
FIG. 2 is a schematic diagram of an overlap region of the three-dimensional capturing devices.

Refer to FIGS. 1~2. FIG. 1 is a schematic diagram of a mobile carrier 800 and a number of three-dimensional capturing devices 110(0), 110(1), 110(2), . . . , 100(N−2), 110(N−1), and 110(N). FIG. 2 is a schematic diagram of an overlap region OL of two adjacent three-dimensional capturing devices 110(0) and 110(1). In the present embodiment, the mobile carrier 800 can be implemented by a vehicle, an automatic conveyor, or a robot, for example. The three-dimensional capturing devices 110(0), 110(1), 110(2), . . . , 100(N−2), 110(N−1), and 110(N) can be implemented by time of flight (ToF) sensors or infrared sensors, for example. The shooting distance of the three-dimensional capturing devices 110(0), 110(1), 110(2), . . . , 100(N−2), 110(N−1), and 110(N) is between 0.5~5 meters. Within the range of 0.5~5 meters, objects, such as pit holes, vehicles, and human bodies, can be precisely detected.

According to the present disclosure, the real-time point cloud sets are captured by a number of three-dimensional capturing devices 110(0), 110(1), 110(2), . . . , 100(N−2), 110(N−1), 110(N), and the objects located at an overlap region OL are captured and the real-time point cloud sets are combined to obtain a panorama point cloud data. In the present embodiment, the shooting angles of adjacent three-dimensional capturing devices 110(0), 110(1), 110(2), ..., 100(N−2), 110(N−1), and 110(N) have an overlap region OL within a range of 5~15° (such as larger than 10°).

Since the coordinate systems C0, C1, C2, CN−2, CN−1, and CN of the three-dimensional capturing devices 110(0), 110(1), 110(2), ..., 100(N−2), 110(N−1), and 110(N) are inconsistent with the coordinate system C800 of the mobile carrier 800, point cloud registration is performed through coordinate transformation, such that the real-time point cloud sets obtained by the three-dimensional capturing devices 110(0), 110(1), 110(2), ..., 100(N−2), 110(N−1), and 110(N) can be combined.

For example, the coordinate system C1 of the three-dimensional capturing device 110(1) can be transformed to the coordinate system C0 through the coordinate transformation matrix T1. The coordinate system C2 of the three-dimensional capturing device 110(2) can be transformed to the coordinate system C0 through the coordinate transformation matrix T2 and the coordinate transformation matrix T1. The coordinate system C3 of the three-dimensional capturing device 110(3) can be transformed to the coordinate system C0 through the coordinate transformation matrix T3, the coordinate transformation matrix T2, and the coordinate transformation matrix T1. Similarly, the coordinate system CN−1 of the three-dimensional capturing device 110(N−1) can be transformed to the coordinate system C0 through the coordinate transformation matrixes TN−1, TN−2, .... The coordinate system CN of the three-dimensional capturing device 110(N) can be transformed to the coordinate system C0 through the coordinate transformation matrix TN, TN−1, .... Thus, through coordinate transformation, the real-time point cloud sets captured by a number of three-dimensional capturing devices 110(0), 110(1), 110(2), ..., 100(N−2), 110(N−1), and 110(N) can combined to obtain a panorama point cloud data. In the example of FIG. 1, the coordinate system of each of the three-dimensional capturing devices 110(0), 110(1), 110(2), ..., 100(N−2), 110(N−1), and 110(N) can be transformed to the coordinate system C0 through two tracking paths. In another embodiment, the coordinate system of each of the three-dimensional capturing devices 110(0), 110(1), 110(2), ..., 100(N−2), 110(N−1), and 110(N) can also be transformed to the coordinate system C0 through one tracking path only in encircling way. For example, the coordinate system CN of the three-dimensional capturing device 110(N) can be transformed to the coordinate system C0 through the coordinate transformation matrixes TN, TN−1, ... T2, and T1.

Figure 3:
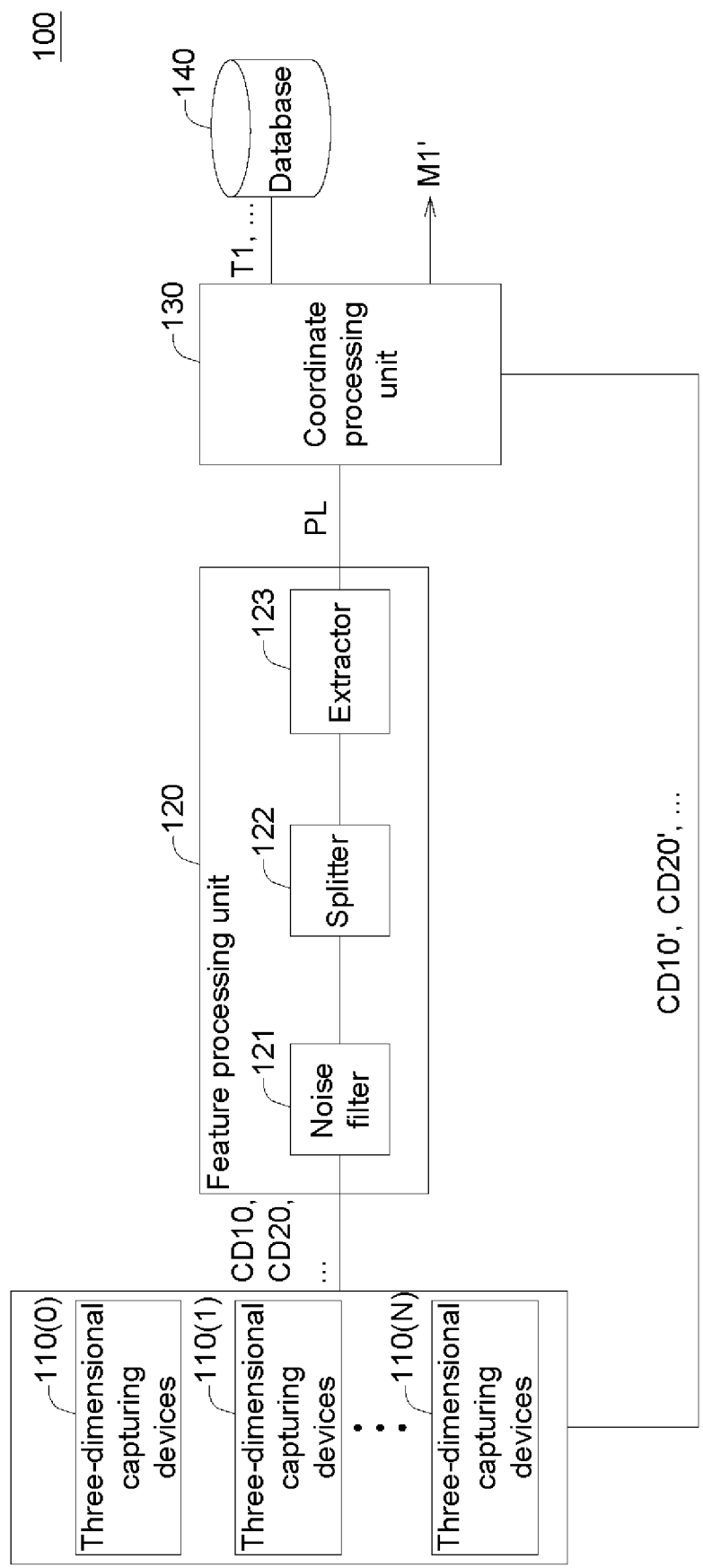
FIG. 3 is a schematic diagram of a building system for panorama point cloud data according to an embodiment.

Referring to FIG. 3, a schematic diagram of a building system 100 for panorama point cloud data according to an embodiment is shown. The building system 100 includes at least two three-dimensional capturing devices 110(0), 110 (1), ..., and 110(N), a feature processing unit 120, a coordinate processing unit 130, and a database 140. The feature processing unit 120 is configured to perform a point cloud feature processing procedure. The coordinate processing unit 130 is configured to perform a computing procedure of coordinate transformation. The feature processing unit 120 and the coordinate processing unit 130 can be, for example, implemented by a chip, a circuit, a circuit board, or a storage device storing multiple programming codes. The database 140 is configured to store data, and can be, for example, implemented by a memory, a hard disc, a cloud data center, or an optical disc. Operations of each element of the building system 100 are disclosed below with an accompanying flowchart.

Figure 4:
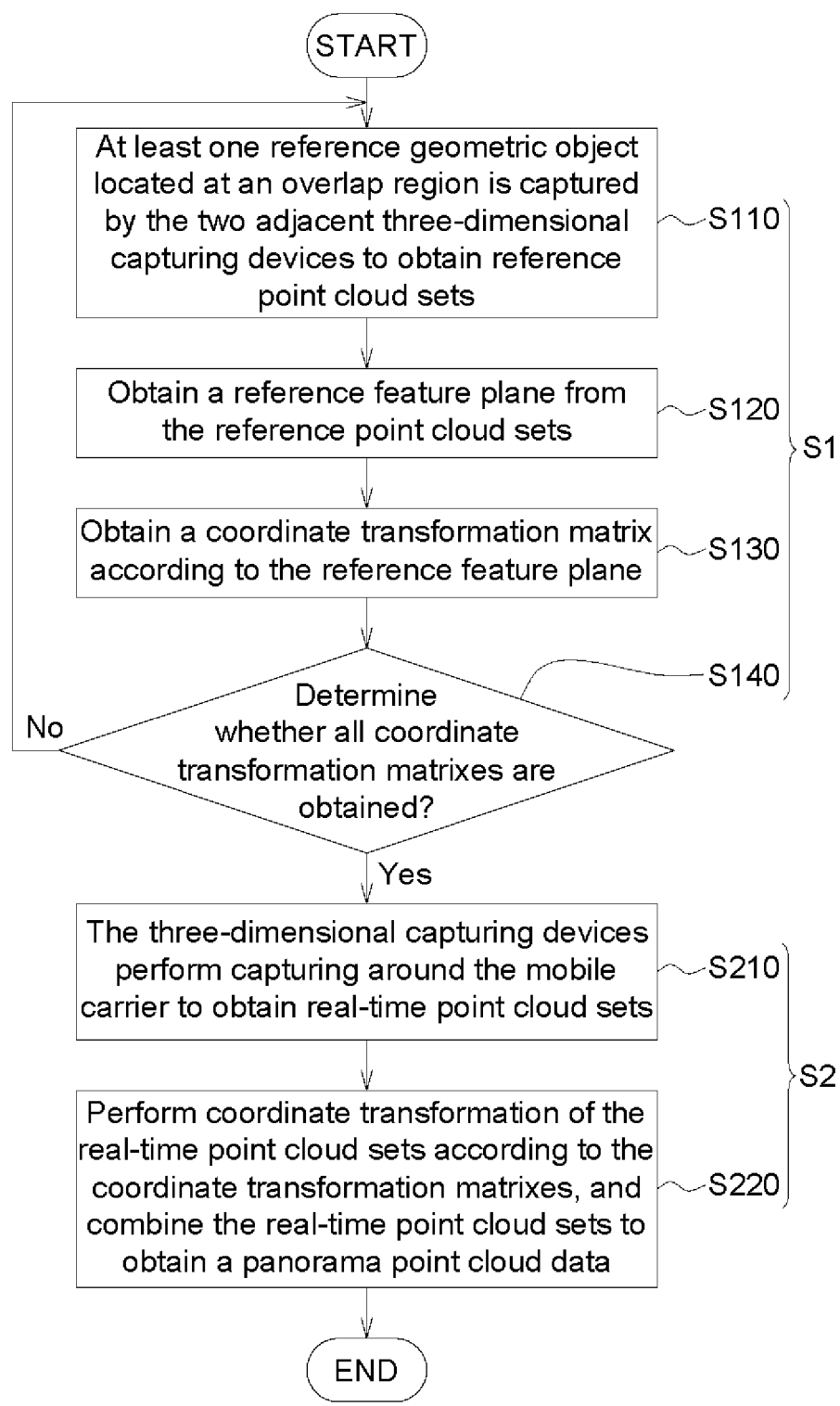
FIG. 4 is a flowchart of a building method for panorama point cloud data according to an embodiment.
Figure 5:
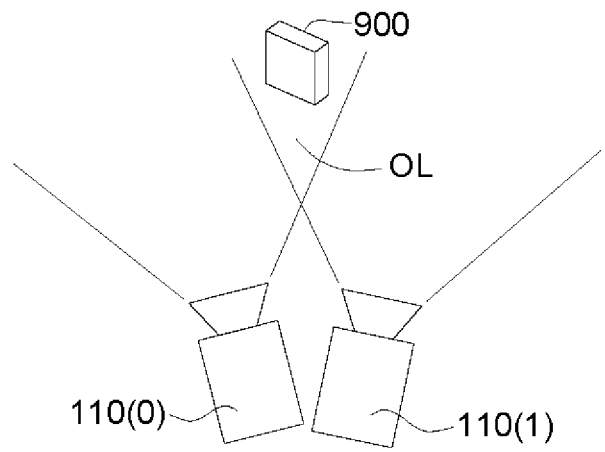
FIGS. 5~9 are schematic diagrams of each step of FIG. 4.

Refer to FIGS. 4~9. FIG. 4 is a flowchart of a building method for panorama point cloud data according to an embodiment. FIGS. 5~9 are schematic diagrams of each step of FIG. 4. The building method for panorama point cloud data of the present embodiment includes a point cloud alignment procedure S1 and a point cloud real-time capturing procedure S2. The method begins at step S110 of the point cloud alignment procedure S1, as indicated in FIG. 5, at least one reference geometric object 900 located at an overlap region OL of two adjacent three-dimensional capturing devices 110(0) and 110(1) is captured by the two adjacent three-dimensional capturing devices 110(0) and 110(1) to obtain reference point cloud sets CD10 and CD20 respectively. The reference geometric object 900 can be, for example, implemented by a cube, a flat object, or a sphere. The quantity of the reference geometric object 900 can be 1 or larger than 2. In the point cloud set CD10 indicated in FIG. 6, each point of tangible objects in a three-dimensional space is illustrated.

Then, the method proceeds to step S120 of the point cloud alignment procedure S1, the feature processing unit 120 obtains a reference feature plane PL from the reference point cloud sets CD10 and CD20.

Figure 6:
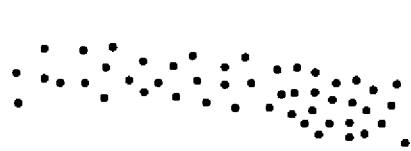
Figure 6:
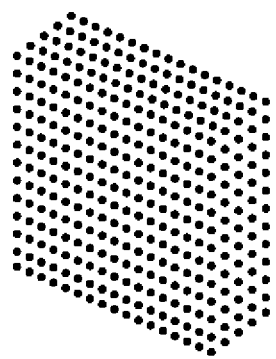
Figure 7:
Figure 7:
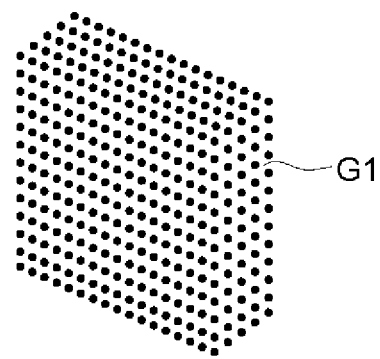

Step S120 includes several detailed operations. FIGS. 6~9 illustrate the process of obtaining the reference feature plane PL from the point cloud set CD10. As indicated in FIGS. 6~7, a noise filter 121 of the feature processing unit 120 filters out noises from the point cloud set CD10 of FIG. 6 to obtain the point cloud set CD11 of FIG. 7. In the point cloud set CD11 of FIG. 7, noises have been filtered off.

Then, a splitter 122 of the feature processing unit 120 divides the image points in the point cloud set CD11 of FIG. 7 into groups G1 and G2 according to the degree of feature similarity by a region growing algorithm.

Figure 8:
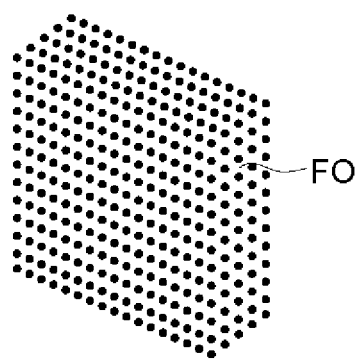

Then, the splitter 122 of the feature processing unit 120 splits group G1 from the groups G1 and G2 of the point cloud set CD11 of FIG. 7 and uses the group G1 as the foreground object FO. FIG. 8 illustrates the point cloud set CD12 containing the foreground object FO.

Figure 9:
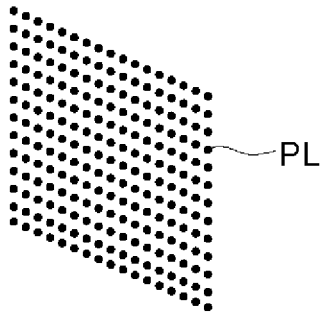

Then, as indicated in FIGS. 8~9, an extractor 123 of the feature processing unit 120 extracts a maximum plane from each of the foreground objects FO and uses the maximum plane as the reference feature plane PL. As indicated in FIG. 8, the extractor 123 transforms the image points of the foreground object FO to a Hough space, and further searches a maximum value in the Hough space by a sliding window algorithm to obtain the maximum plane.

Then, the method proceeds to step S130 of the point cloud alignment procedure S1, the coordinate processing unit 130 obtains a coordinate transformation matrix T1 according to the reference feature plane PL. In the present step, the coordinate transformation matrix T1 can be obtained by an iterative closest points (ICP) algorithm having a K-D tree structure.

The coordinate transformation matrix T1 can be stored in the database 140 for the use of the point cloud real-time capturing procedure S2.

Then, the method proceeds to step S140, whether all coordinate transformation matrixes are obtained is determined. If not all coordinate transformation matrixes are obtained, then the method returns to step S110 to perform the point cloud alignment procedure S1 again. If all coordinate transformation matrixes are obtained, then the method proceeds to the point cloud real-time capturing procedure S2.

In step S210 of the point cloud real-time capturing procedure S2, the three-dimensional capturing devices 110 (0), 110(1), 110(2), ..., 100(N−2), 110(N−1), 110(N)

perform capturing around the mobile carrier 800 to obtain a number of real-time point cloud sets CD10', CD20', . . . .

Then, the method proceeds to step S220 of point cloud real-time capturing procedure S2, the coordinate processing unit 130 performs coordinate transformation of the real-time point cloud sets CD10', CD20', according to the coordinate transformation matrixes TC, T1, T2, T3, . . . , TN−1, and TN, and combines the real-time point cloud sets CD10', CD20', . . . to obtain a panorama point cloud data M1'.

According to the above embodiments, when the mobile carrier 800 is equipped with the building system 100 for panorama point cloud data, point cloud registration can be performed by the point cloud alignment procedure S1, and a point cloud real-time capturing procedure S2 can be performed to obtain a panorama point cloud data M1'. The panorama point cloud data M1' has high precision and is capable of obtaining the near distance status within 0.5~5 meters. When the mobile carrier 800 moves at a speed of 5~10 kilometers per hour, the building system 100 for panorama point cloud data is particularly applicable to the driver/mobile assistance system.

Figure 10:
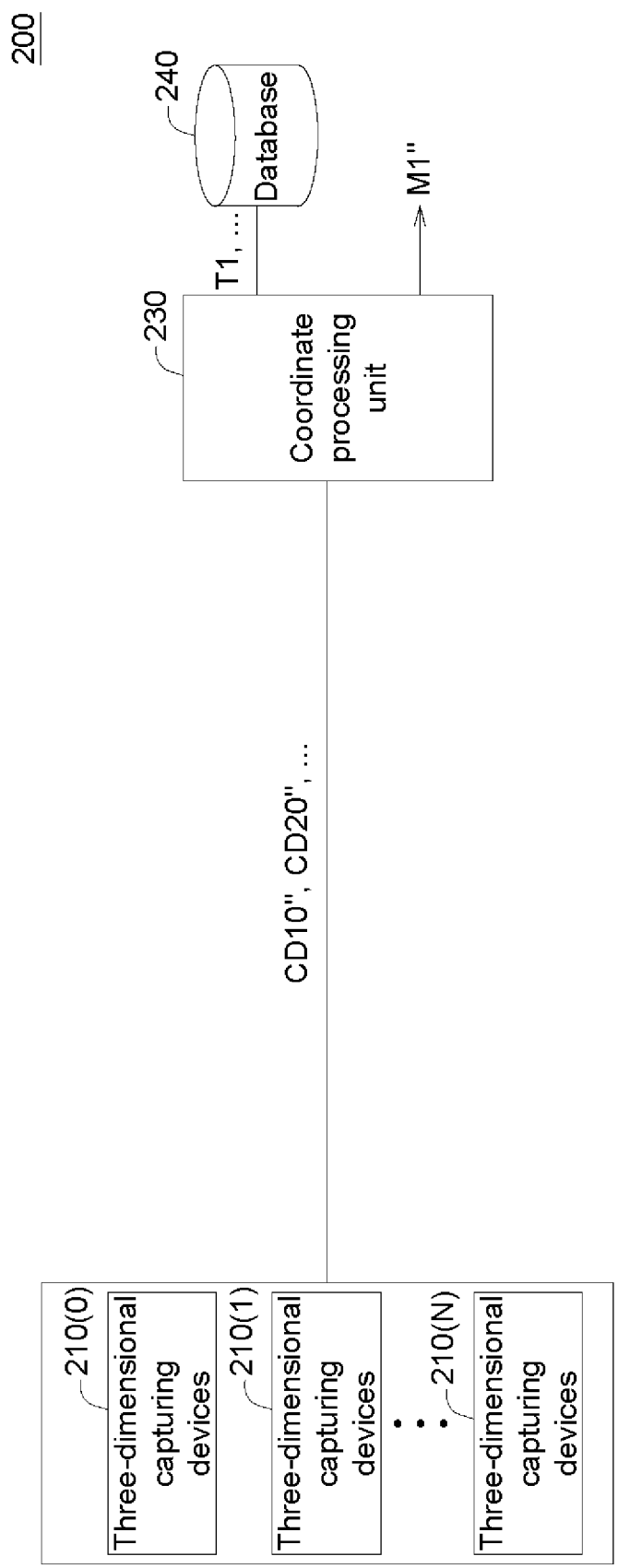
FIG. 10 is a schematic diagram of a building system for panorama point cloud data according to another embodiment.

In another embodiment, given that the coordinate transformation matrix TC, T1, T2, T3, . . . , TN−1, and TN are all obtained, the point cloud real-time capturing procedure S2 can be performed directly without having to perform the point cloud alignment procedure S1 in advance. Referring to FIG. 10, a schematic diagram of a building system 200 for panorama point cloud data according to another embodiment is illustrated. The building system 200 includes a number of three-dimensional capturing devices 210(0), 210(1), 210(N), a coordinate processing unit 230, and a database 240. The coordinate transformation matrixes TC, T1, T2, T3, . . . , TN−1, and TN are already pre-stored in the database 240, and there is no need to perform the point cloud alignment procedure S1. The building system 200 can directly perform the point cloud real-time capturing procedure S2. The coordinate processing unit 230 performs the coordinate transformation of the real-time point cloud sets CD10", CD20"', . . . according to the coordinate transformation matrixes T1, . . . , and combines the real-time point cloud sets CD10", CD20", . . . to obtain a panorama point cloud data M1". The panorama point cloud data M1" has high precision and is capable of obtaining the near distance status within 0.5~5 meters. When the mobile carrier 800 moves at a speed of 5~10 kilometers per hour, the building system 100 for panorama point cloud data is particularly applicable to the driver/mobile assistance system.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A building method for panorama point cloud data, comprising:
   capturing at least one reference geometric object located at an overlap region of two adjacent three-dimensional capturing devices by the two adjacent three-dimensional capturing devices to obtain two reference point cloud sets;
   obtaining a reference feature plane from each of the reference point cloud sets;
   obtaining a coordinate transformation matrix according to the reference feature planes, wherein the coordinate transformation matrix is obtained by an iterative closest points algorithm having a K-D tree structure;
   obtaining a plurality of real-time point cloud sets by the three-dimensional capturing devices; and
   performing coordinate transformation of the real-time point cloud sets according to the coordinate transformation matrix, and combining the real-time point cloud sets to obtain the panorama point cloud data.

2. The building method for panorama point cloud data according to claim 1, wherein the step of obtaining the reference feature plane from each of the reference point cloud sets comprises:
   filtering out noises from each of the reference point cloud sets;
   generating foreground objects by splitting each of the reference point cloud sets; and
   extracting a maximum plane from each of the foreground objects and using the maximum plane as the reference feature plane.

3. The building method for panorama point cloud data according to claim 2, wherein the step of generating the foreground object from each of the reference point cloud sets comprises:
   dividing a plurality of image points into a plurality of groups according to the degree of feature similarity by a region growing algorithm; and
   obtaining the foreground object from the groups.

4. The building method for panorama point cloud data according to claim 2, wherein the step of extracting the maximum plane from each of the foreground objects and using the maximum plane as the reference feature plane comprises:
   transforming a plurality of image points of each of the foreground objects to a Hough space; and
   searching a maximum value in the Hough space by a sliding window algorithm to obtain the maximum plane.

5. The building method for panorama point cloud data according to claim 1, wherein the reference geometric object is a cube, a flat object, or a sphere.

6. The building method for panorama point cloud data according to claim 1, wherein the quantity of the at least one reference geometric object is larger than 2.

7. The building method for panorama point cloud data according to claim 1, wherein an overlap angle of the three-dimensional capturing devices is larger than 10°.

8. The building method for panorama point cloud data according to claim 1, wherein the shooting distance of each of the three-dimensional capturing devices is between 0.5~5 meters.

9. The building method for panorama point cloud data according to claim 1, wherein the three-dimensional capturing devices are time of flight (ToF) sensors or infrared sensors.

10. A building system for panorama point cloud data, comprising:
    two three-dimensional capturing devices disposed adjacent to each other and configured to capture at least one reference geometric object located at an overlap region of the three-dimensional capturing devices to obtain two reference point cloud sets;
    a feature processing unit configured to obtain a reference feature plane from each of the reference point cloud sets; and
    a coordinate processing unit configured to obtain a coordinate transformation matrix according to the reference feature planes, wherein the three-dimensional capturing devices further perform capturing to obtain a plurality of real-time point cloud sets, and the coordinate processing unit performs coordinate transformation of the real-time point cloud sets according to the coordinate transformation matrix and combines the real-time point cloud sets to obtain the panorama point cloud data, and the coordinate transformation matrix is obtained by an iterative closest points algorithm having a K-D tree structure.

11. The building system for panorama point cloud data according to claim 10, wherein the feature processing unit comprises:
   a noise filter configured to filter out noises from each of the reference point cloud sets;
   a splitter configured to generate foreground objects by splitting each of the reference point cloud sets; and
   an extractor configured to extract a maximum plane from each of the foreground objects and using the maximum plane as the reference feature plane.

12. The building system for panorama point cloud data according to claim 11, wherein the splitter divides a plurality of image points into a plurality of groups according to the degree of feature similarity by a region growing algorithm and further obtains the foreground objects from the groups.

13. The building system for panorama point cloud data according to claim 11, wherein the extractor transforms a plurality of image points of each of the foreground objects to a Hough space, and searches a maximum value in the Hough space by a sliding window algorithm to obtain the maximum plane.

14. The building system for panorama point cloud data according to claim 10, wherein the reference geometric object is a cube, a flat object, or a sphere.

15. The building system for panorama point cloud data according to claim 10, wherein the quantity of the at least one reference geometric object is larger than 2.

16. The building system for panorama point cloud data according to claim 10, wherein an overlap angle of the three-dimensional capturing devices is larger than 10°.

17. The building system for panorama point cloud data according to claim 10, wherein the shooting distance of each of the three-dimensional capturing devices is between 0.5~5 meters.

18. The building system for panorama point cloud data according to claim 10, wherein the three-dimensional capturing devices are time of flight (ToF) sensors or infrared sensors.

19. A non-transitory computer readable storage device storing a plurality of instructions, when executed by at least one processing unit, causing said at least one processing unit to execute a building method for panorama point cloud data, wherein the building method for panorama point cloud data comprises:
   capturing at least one reference geometric object located at an overlap region of two adjacent three-dimensional capturing devices by the two adjacent three-dimensional capturing devices to obtain two reference point cloud sets;
   obtaining a reference feature plane from each of the reference point cloud sets;
   obtaining a coordinate transformation matrix according to the reference feature planes, wherein the coordinate transformation matrix is obtained by an iterative closest points algorithm having a K-D tree structure;
   obtaining a plurality of real-time point cloud sets by the three-dimensional capturing devices; and
   performing coordinate transformation of the real-time point cloud sets according to the coordinate transformation matrix, and combining the real-time point cloud sets to obtain the panorama point cloud data.

* * * * *